United States Patent [19]

Walker

[11] Patent Number: 4,979,790

[45] Date of Patent: Dec. 25, 1990

[54] GUIDED-WAVE OPTICAL WAVELENGTH DUPLEXER

[75] Inventor: Robert G. Walker, Northampton, England

[73] Assignee: Plessey Overseas Limited, Ilford, England

[21] Appl. No.: 426,870

[22] Filed: Oct. 26, 1989

[30] Foreign Application Priority Data

Oct. 28, 1988 [GB] United Kingdom ............... 8825282

[51] Int. Cl.$^5$ ............................................. G02B 6/26
[52] U.S. Cl. ............................... 350/96.15; 350/96.18
[58] Field of Search ............... 350/96.12, 96.13, 96.14, 350/96.15, 96.18, 96.20

[56] References Cited

U.S. PATENT DOCUMENTS 4,652,076 3/1987 Unger ........................... 350/96.12
4,787,689 11/1988 Korotky et al. ................. 350/96.12

Primary Examiner—Akm Ullah
Attorney, Agent, or Firm—Fleit, Jacobson, Cohn, Price, Holman & Stern

[57] ABSTRACT

A guided-wave optical wavelength duplexer fabricated as an integrated optical device, comprising input ports (2, 4) for light at different wavelengths ($a_1$, $a_2$) coupled to first and second waveguides (6, 8) formed on a substrate surface, the first and second waveguides having first and second coupler regions (10, 12) to enable light to be transferred from one waveguide to the other, the first and second waveguides as at (26) between the first and second coupler regions being formed as circular arcs having the same center to provide an accurately defined optical path length difference, so that light at a first wavelength ($a_1$) is output through one output port (14) and the second component ($a_2$) is output through another output port (16).

10 Claims, 3 Drawing Sheets

GUIDED-WAVE OPTICAL WAVELENGTH DUPLEXER

FIELD OF THE INVENTION

This invention relates to a guided-wave optical wavelength duplexer formed as an integrated optical device.

BACKGROUND ART

Guided-wave optical wavelength duplexers based on Mach-Zehnder interferometer constructions have been described in "Integrated four-channel mach-zehnder multiplexes fabricated with phosphorous doped SiO$_2$ waveguides on Si", C.H. Henry et al, Topical Meeting On Integrated And Guided-Wave Optics, March 1988, Santa Fe, N. Mex., 1988 Technical Digest Series Volume 5 pp66–69. A typical configuration is shown in FIG. 1. The device has input ports 2, 4 to respective waveguides 6, 8 fabricated as elongate regions of increased refractive index in a crystal having a transparent surface. A directional coupler region 10 is provided in which the two waveguides 6, 8 are positioned sufficiently close together for light to be transferred from waveguide 8 to waveguide 6. Subsequently the two waveguides diverge and waveguide 8 extends in a straight line to a further directional coupler region 12 where the two waveguides are again positioned sufficiently close for light to be transferred between waveguides. The other waveguide 6 extends to region 12 in a curved contour having a longer path length (L+ΔL) than the path length L of straight waveguide 8. Two output ports 14, 16 are provided. Thus in this arrangement incoming light at input port 4 containing spectral components $a_1$ and $a_2$ is split into two equal portions in region 10 and these portions are recombined in region 12. However, as a result of the incremental difference in path length light at wavelength $a_1$ is combined constructively in waveguide 6 to provide an output at 14 comprising wavelength $a_1$ whereas the light in waveguide 8 has the $a_1$ component cancelled to provide an output at 16 comprising $a_2$ wavelength. This effect is illustrated in FIG. 2 which shows the intensity of light output at output 14 as a function of wavelength. It can be seen the function is sinusoidal with a peak at $a_1$ and a minimum at $a_2$.

The path difference (ΔL) introduces an optical phase difference $-\Delta p$ where $$\Delta p = \frac{2\pi}{a} \Delta L . n(a)$$

a is the optical wavelength
n(a) is the waveguide "effective" refractive index which is a function of (a) via the waveguide/material dispersion function.

If Δp is an even multiple of π (180°) all the light will exit at port 14. If Δp is an odd multiple of π the light exits at 16. The output levels are sinusoidal functions of Δp and hence of a and ΔL. It is desired to set ΔL to such a value that the two design wavelengths exit at different ports with high purity.

In one envisaged application for the present invention, the duplexer is to be employed in an integrated optoelectronic transmit/receive chip which contains a laser transmitter and a photodetector receiver and a wavelength duplexer for separating incoming light (e.g. 1.53μm wavelength) from outgoing light (e.g. 1.3μm wavelength), the traffic in both directions being carried on the same optical fibre link which is coupled to the chip. A major problem with such an arrangement is that the signal being transmitted has a much higher intensity level than the received signal and therefore near-end crosstalk (reception of the outgoing signal by the photodetector) must be reduced as much as possible. In addition such a chip which will be manufactured in large numbers, should have its parameters correctly determined at manufacture without the need for subsequent tuning.

The known duplexer shown in FIG. 1 has some disadvantages for such an application. One problem is that curved portions of a waveguide which are employed to generate the differing path lengths tend to scatter radiation, even when fabricated with smooth edges. This problem is compounded in practice, since curved waveguides have a digitally stepped form arising from the mask-write step in the fabrication process. Thus the curved waveguide tends to be more lossy than the straight waveguide and this worsens crosstalk. In addition, the curved waveguide has transitional regions, in which losses occur, of changes in curvature, namely two straight line to curving transitions in the regions 18, 20 and curvature reversal regions 22, 24. As a further problem, mixing straight and curved waveguides makes the propagation parameters of the duplexer difficult to compute in advance.

SUMMARY OF THE INVENTION

In accordance with the invention, in order to reduce the above-noted problems, there is provided a guided-wave optical wavelength duplexer fabricated as an integrated optical device, the device comprising an input port means coupled to first and second waveguides formed on a substrate surface, the first and second waveguides being arranged in first and second coupler regions to enable light to be transferred from one waveguide to the other, the first and second waveguides between the first and second coupler regions being curved in the same general direction and having different optical path lengths, so that for light incoming at the input port means having spectral components of first and second wavelengths, the first component is output through one of first and second output ports and the second component is output through the other output port.

By providing the waveguides both curving in the same general direction there is ensured an incremental difference in path length, since the waveguide positioned inwardly of the curve will be slightly shorter than the outer waveguide. Further such a configuration ensures no sudden transitions in which losses may occur and further that losses occur equally in both regions. As preferred the curved portions curve in a similar way, and are preferably circular having generally the same centre. The choice of circular arcs having the same centre is a particularly simple and convenient option to manufacture. It ensures a high degree of accuracy in the determination of path length, and that radiation losses are equally spread between both waveguides and are kept to a minimum.

The waveguides between the first and second coupler regions and the curved regions diverge preferably in a symmetrical and preferably sinuous manner until they are spaced a sufficient distance that the waveguides are decoupled.

As a further advantage of the invention, the curvature of the waveguides ensures that said first and second coupler regions extend in different directions whereby unwanted reflections from a dielectric boundary beyond the second region but perpendicular to the first coupler region will not coupler back into the waveguides at the second coupler region.

The input port means may comprise first and second input ports coupled to respective waveguides or a single input port. The waveguide coupler regions may comprise parallel portion of the waveguides closely positioned together, Y-junctions, or a 3-guide coupler wherein light is input on a third waveguide between parallel portions of the first and second waveguides. The different coupler regions types provide different phase changes in light coupled into the waveguides and a choice of type is made depending on the precise characteristics of the duplexer required.

BRIEF DESCRIPTION OF THE DRAWINGS

Preferred examples of the invention will now be described with reference to the accompanying drawings, wherein.

DESCRIPTION OF THE PREFERRED EMBODIMENTS

Figure 1:
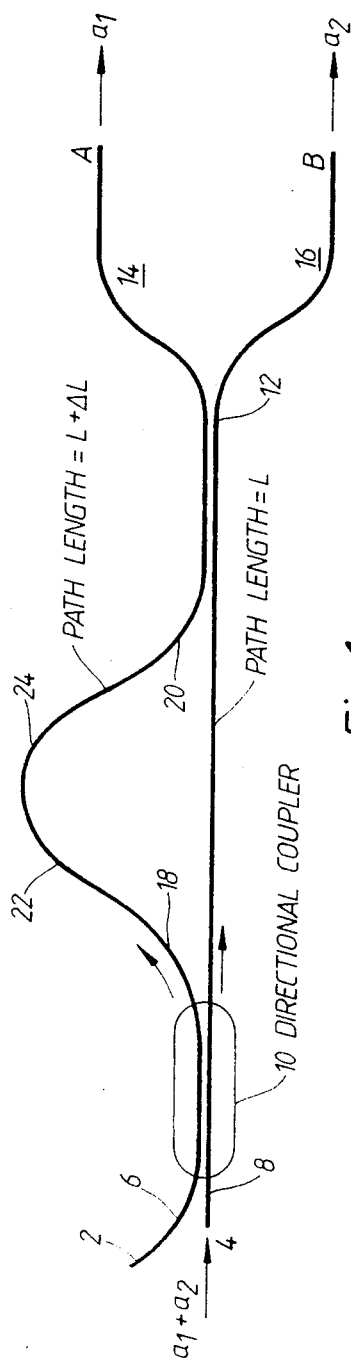
FIG. 1 is a schematic view of a known type of guided-wave optional wavelength duplexer.
Figure 2:
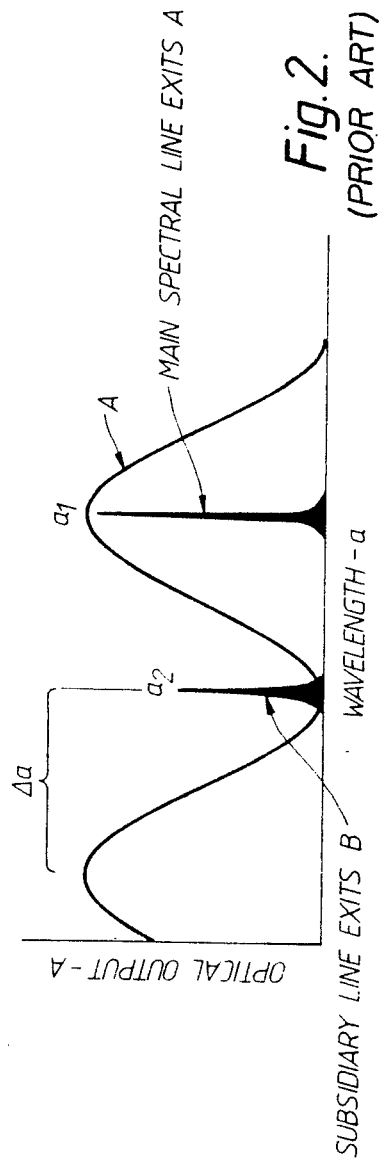
FIG. 2 is a graphical representation of the operation of the embodiment of FIG. 1.
Figure 3:
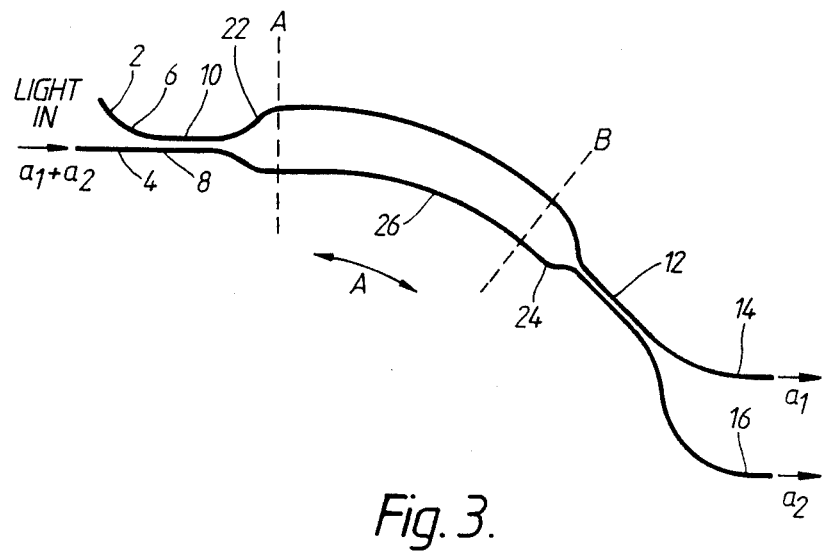
FIG. 3 is a schematic view of a first and preferred embodiment of the invention.

Referring now to FIG. 3 there is shown the first embodiment of the invention wherein similar parts to those of FIG. 1 are identified by the same reference numerals. The waveguides in the regions 22 and 24 adjacent coupler regions 10, 12 diverge in a symmetrical and sinuous manner until they are spaced sufficiently far apart that no coupling occurs between them. This distance may be about 10 microns. The region 26 of the waveguides between lines A and B form arcs of a circle. The angle of the arc in practice is about 4°. Both arcuate portions have a common centre and thus the difference in radii $R_1$, $R_2$ of the two arcs equals the waveguide centre-to-centre spacing. The path difference $\Delta L$ is as follows:

$$\Delta L = R_1 A - R_2 A = \Delta R.A$$

where A is the arc-angle.

Thus in accordance with this arrangement it is possible to compute precisely the path difference between the two waveguides and to preset this value at manufacture. Since both waveguides have nearly the same curvature, they are balanced as regards loss and propagation properties. Since $\Delta L$ increases linearly with A and $\Delta R$, substantial $\Delta L$ values can be achieved efficiently. The regions 10 and 12 are off-set and extend in different directions to one another; thus light scattered forward at region 10 will not be reflected back from region 12 into the input

EXAMPLE

To duplex 1.3μm and 1.53μm light using InP/InGaAsP waveguides requires:

$$\Delta L = 1.1915 \mu m$$

The known S-bend (bulge) method (FIG. 1) gives a maximum separation of 30μm and a length, between the splitter and recombiner, of 2.014 mm using a bend radius of 8.5 mm.

The concentric arc method (FIG. 3), with a minimal, 15μm, guide separation requires an arc of 4.55° which, at R=8.5 mm, is 675μm long. Including the length needed to diverge and converge (at the same radius) gives a total length of 1.475 mm. Thus, in addition to the other advantages, the total device is half a millimetre shorter.

Figure 4:
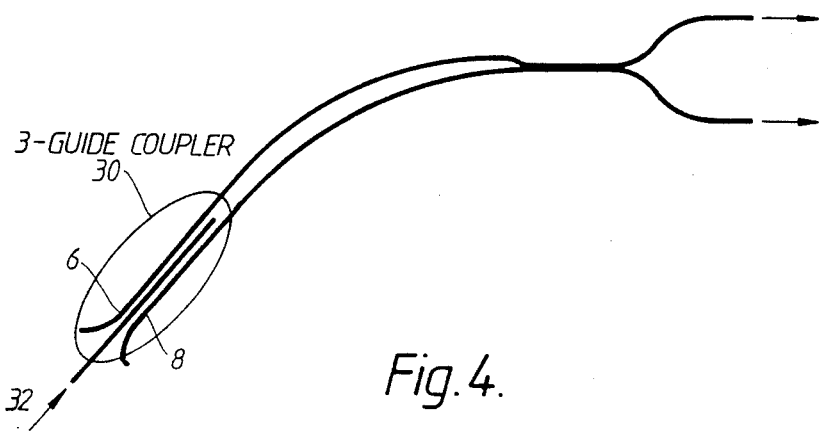
FIG. 4 is a schematic view of a second embodiment of the invention.

Referring to FIG. 4, this shows a variant of the arrangement of FIG. 3 wherein similar parts are denoted by the same reference numerals. The main difference between the embodiments of FIG. 3 and FIG. 4 is that FIG. 4 employs a waveguide coupler region at its input 30 wherein light is fed into the waveguide on a single input line 32 which is positioned symmetrically between the two waveguides 6, 8 in region 30. Unlike the usual coupler 10 which uses two parallel waveguides, this provides no phase difference (of $\pi/2$) in the light signals coupled into waveguides 6 and 8. This shifts the periodic output/wavelength function by a one quarter period. A similar effect can be achieved by substituting for the separate waveguide 32 a Y-junction wherein an input line is integrally coupled to the input ports of waveguides 6, 8 so as to provide a Y-junction.

The use of different types of input coupler arrangements, providing different phase changes, has use when selecting an optimum waveguide configuration for a particular pair of spectral wavelengths.

Figure 5:
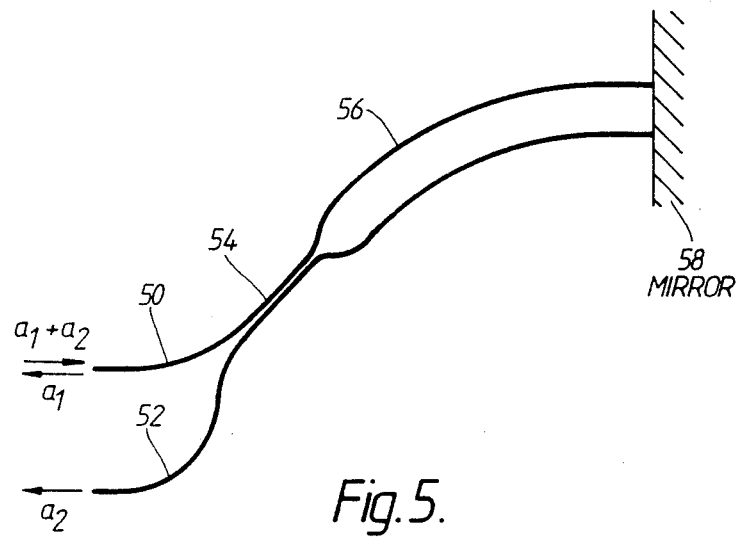
FIG. 5 is a schematic view of a third embodiment of the invention.

Referring now to FIG. 5 there is indicated a variation wherein the input and output ports are combined as ports 50, 52. A single light coupler region 54 is provided, and a curved waveguide portion 56, half the length of that shown as portion 26 in FIG. 3 (the arc A being bisected) is provided being coupled to a mirror 58 (indicated schematically) which is normal to the waveguide ends and reflects the light back into the waveguides and thence to the ports 50, 52. The advantage of this arrangement is that it saves space if it is required only to reject one wavelength by sending it back up the input channel 50, so that light at wavelength a2 can be extracted from port 52.

Figure 6:
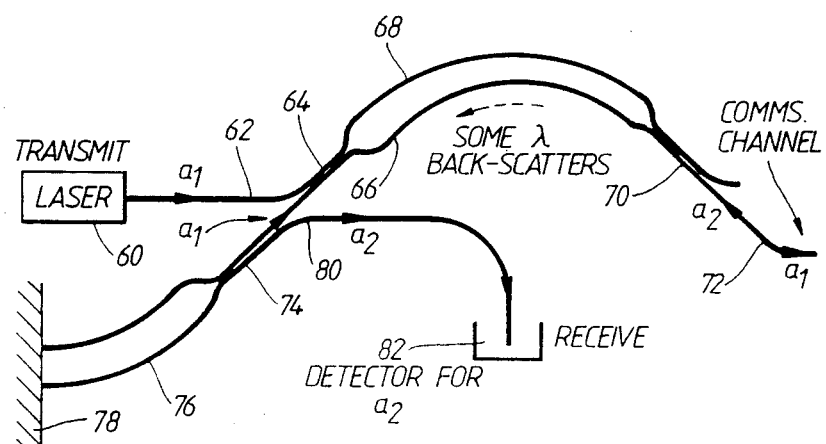
FIG. 6 is a schematic view of a combination of the first and third embodiments of the invention in an optical transmit/receive circuit.

FIG. 6 shows a variation in which the embodiment of FIG. 3 is combined with that of FIG. 5 is a transmit/receive device so that light is transmitted from a laser 60 into input port 62 where it is coupled in a region 64 to two waveguides 66, 68 which extend in circular arcs to a second coupler region 70 whereafter light exits at an output port 72. Incoming light at wavelength a2 also enters via port 72 and is conducted along waveguides 66, 68 so that the input radiation at a2 enters a further waveguide coupling region 74, thence to waveguide region 76 for reflection by a mirror 78. The overall effect of this is that light at wavelength a2 is extracted from input/output port 80 to a photo detector 82. The advantage of this arrangement is that the further duplexer comprising coupler region 74, waveguides 76 and mirror 78 (cf FIG. 5) provides a filtering effect to enable incoming radiation at a2 to be extracted with a high degree of purity from port 80.

It will be understood that although the waveguides of the above embodiment have been described as of fixed length, it would be possible to insert electrodes in order to perturb the optical path lengths by applying selected voltages to the electrodes, thus achieving electrical fine tuning of the wavelengths. This would require the device to be fabricated on an electro-optic medium.

I claim:

1. A guide-wave optical wavelength duplexer fabricated as an integrated optical device, the device comprising an input port means coupled to first and second waveguides formed on a substrate surface, the first and second waveguides being arranged in first and second coupler regions to enable light to be transferred from one waveguide to the other, the first and second waveguides between the first and second coupler regions being curved in the same general direction and having different optical path lengths, so that for light incoming at the input port means having spectral components of first and second wavelengths, the first component is output through one of first and second output ports and the second component is output through the other output port.

2. A device as claimed in claim 1, wherein the curved portions of the waveguides form circular arcs.

3. A device as claimed in claim 2, wherein the arcs have the same centre.

4. A device as claimed in claim 1, wherein the waveguides diverge from said first and second coupler regions in a symmetric and sinuous manner to the curved region.

5. A device as claimed in claim 1 wherein at least one of said first coupler region and said coupler second region comprises said waveguides extending parallel to one another for a predetermined distance.

6. A device as claimed in claim 1 wherein at least one of said first and second coupler regions comprises a third waveguide positioned between the first and second waveguides.

7. A device as claimed in claim 1 wherein at least one of said first and second coupler regions comprises a Y-junction constituted by the first and second waveguides.

8. A device as claimed in any of claims 5 to 7 wherein the form of said first and second regions are selected in relation to the path difference between said first and second waveguides to enable desired characteristics to be obtained.

9. A device as claimed in claim 1 wherein the input port and the output ports are combined and reflective mirrors are provided at an end of the waveguides to reflect light back to the combined ports.

10. A device as claimed in claim 9, including a filter device coupled to an output port to provide a filter function for a spectral component of light provided at an output, the filter device comprising an input port means coupled to third and fourth waveguides formed on said substrate surface, the third and fourth waveguides being arranged in third and fourth coupler regions to enable light to be transferred from one waveguide to the other, the third and fourth waveguides between the third and fourth coupler regions being curved in the same general direction and having different optical path lengths, so that for light incoming at the input port means having spectral components of first and second wavelengths, the first components is output through one of third and fourth output ports and the second component is output through the other output port.

* * * * *